United States Patent [19]

Wu

[11] Patent Number: 5,643,517

[45] Date of Patent: Jul. 1, 1997

[54] METHOD FOR MANUFACTURING AN INTEGRAL MULTILAYER FOAM BOARD WITH CONCAVE/CONVEX SURFACE AND MULTIPLE COLORS

[75] Inventor: Fu-Jern Wu, Changhua Hsien, Taiwan

[73] Assignee: How Goung Industry Co., Ltd., Taiwan

[21] Appl. No.: 506,035

[22] Filed: Jul. 24, 1995

[51] Int. Cl.⁶ .................................................. B29C 43/20
[52] U.S. Cl. ........................ 264/139; 264/138; 264/245; 264/321
[58] Field of Search ........................ 264/321, 245, 264/139, 138

[56] References Cited

U.S. PATENT DOCUMENTS

| | | | |
|---|---|---|---|
| 3,396,062 | 8/1968 | White | 264/321 |
| 3,665,792 | 5/1972 | Bush et al. | 83/19 |
| 4,360,491 | 11/1982 | Holden, Jr. | 264/321 |
| 4,964,936 | 10/1990 | Ferro | 264/321 |
| 5,318,645 | 6/1994 | Yang | 264/245 |
| 5,338,594 | 8/1994 | Wang et al. | 264/321 |
| 5,350,544 | 9/1994 | Bambara et al. | 264/321 |
| 5,549,858 | 8/1996 | Krotseng | 264/321 |

FOREIGN PATENT DOCUMENTS

| | | | |
|---|---|---|---|
| 0208268 | 1/1987 | European Pat. Off. | 264/321 |
| 2006966 | 1/1970 | France | 264/321 |
| 63-16257 | 4/1988 | Japan | 264/321 |
| 2067460 | 7/1981 | United Kingdom | 264/321 |

*Primary Examiner*—Allan R. Kuhns
*Attorney, Agent, or Firm*—Bacon & Thomas

[57] ABSTRACT

A method for manufacturing an integral multilayer foam board with concave/convex surface and multiple colors. The method includes steps of placing a multilayer foam body having multiple colors into a heating means to be heated and softened at a temperature within 130° C. to 170° C., placing the multilayer foam body onto a mold and pressed thereinto to be molded with multiple convex portions defined by concave frame lines, partially planing the convex portion of the foam body, and placing the planed foam body into the heating means to be re-heated at a temperature within 100° C. to 140° C., making the convex portions form concave portions and the frame lines become convex.

1 Claim, 3 Drawing Sheets

METHOD FOR MANUFACTURING AN INTEGRAL MULTILAYER FOAM BOARD WITH CONCAVE/CONVEX SURFACE AND MULTIPLE COLORS

BACKGROUND OF THE INVENTION

The present invention relates to a method for manufacturing an integral multilayer foam board with concave/convex surface and multiple colors. The multilayer foam board is molded with multiple convex portions defined by concave frame lines. By means of partially planing the convex portion of the foam body and re-heating the planed foam board, the convex portions thereof form concave portions, while the frame lines reversely become convex. The multilayer foam board has an appearance with multiple layers of colors and has a concave/convex surface which provides slipproof effect and massaging function for a user's sole.

Conventionally, a multilayer foam board is made by a mold. The mold can be designed with irregular or otherwise geometrical shape, whereby after the foaming material is fed into the mold and foamed, the foam board is formed with a geometrical figure to improve the appearance thereof. In addition, after the foam board is molded, a color can be added to the foam board to beautify the product. However, some shortcomings exist in the conventional measure as follows:

1. The mold has an irregular concave/convex shape so that the foam board is molded to have corresponding irregular concave/convex shape. This creates a better appearance and a slipproof effect of the foam board. However, the face of the foam board has a single color and is monotonous. With respect to a multilayer foam board with multiple colors in the respective layers, the face of the board still only has a single color and fails to create a satisfactory appearance.

2. After the foam board is molded, an outer face plate printed with colorful decorative pictures can be attached to the face of the foam board to improve the appearance thereof. Such outer face plate is adhered to the face of the foam board by an adhesive agent and is apt to separate from the face of the foam board after a period of use. In addition, in the case that the foam board is used to manufacture a shoe sole, a wearer's sole always abrades off the printed pictures of the face plate. In the case that the foam board is used to manufacture other articles such as a paving, the printed pictures of the face plate are also subject to abrasion and apt to detach from the face plate after a short period of use. Moreover, the face plate is additionally manufactured, printed and adhered to the foam board, so that the manufacturing cost of the foam board product is relatively high.

3. The concave/convex surface of the foam board is able to massage a user's sole. However, generally the foam board is additionally processed to form the concave/convex surface after the foam board is molded. This is not economic.

SUMMARY OF THE INVENTION

It is therefore a primary object of the present invention to provide a method for manufacturing an integral multilayer foam board with concave/convex surface and multiple colors. The method includes steps of placing a multilayer foam body having multiple colors into a heating means to be heated and softened at a temperature within 130° C. to 170° C., placing the multilayer foam body onto a mold and pressed thereinto to be molded with multiple convex portions defined by concave frame lines, partially planing the convex portion of the foam body, and placing the planed foam body into the heating means to be re-heated at a temperature within 100° C. to 140° C., making the convex portions form concave portions and the frame lines become convex. The multilayer foam board has an appearance with multiple layers of colors and has a concave/convex surface. When used to manufacture a shoe sole, he multilayer foam board provides a slipproof effect and a massaging function for a user's sole.

The present invention can be best understood through the following description and accompanying drawings, wherein:

DETAILED DESCRIPTION OF THE PREFERRED EMBODIMENT

Figure 1:
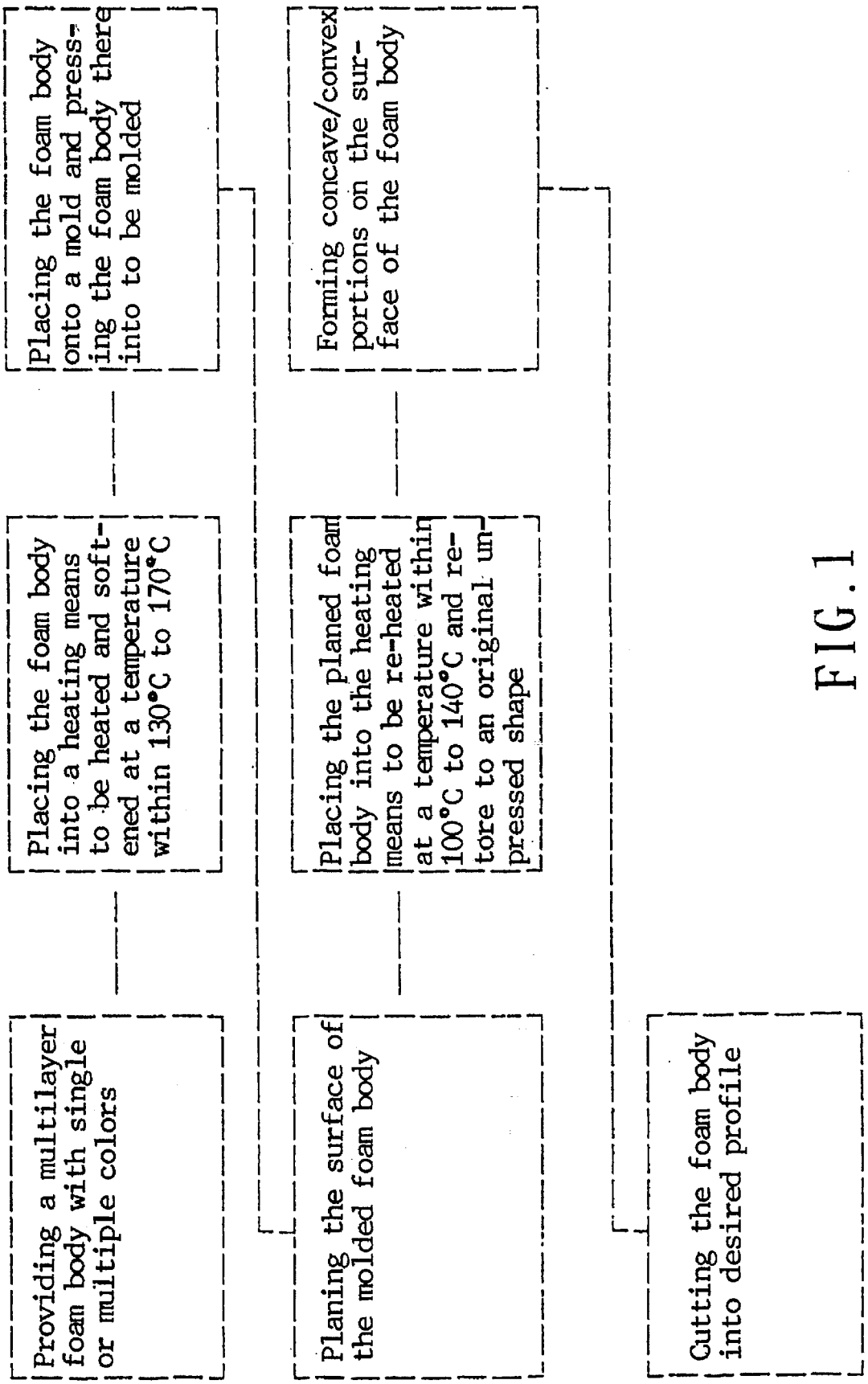
FIG. 1 is a flow chart of the present invention.
Figure 3:
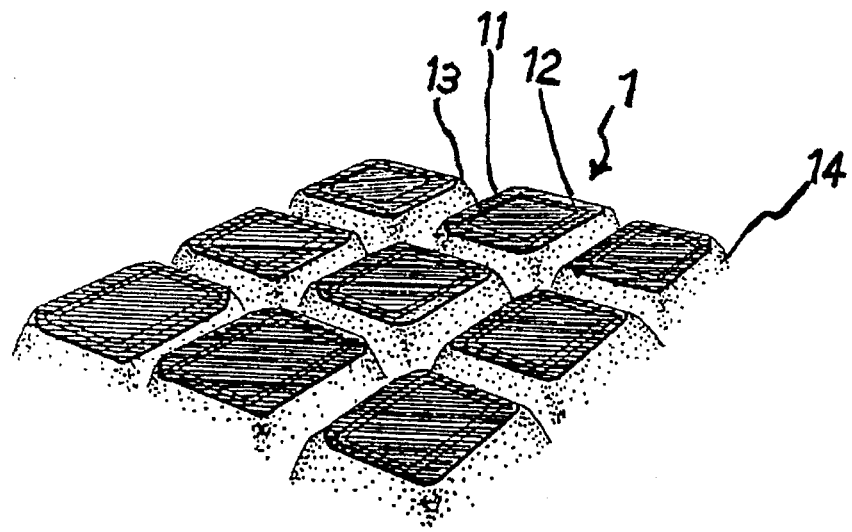
FIG. 3 is a perspective view of the semiproduct of the multilayer foam board of the present invention.
Figure 4:
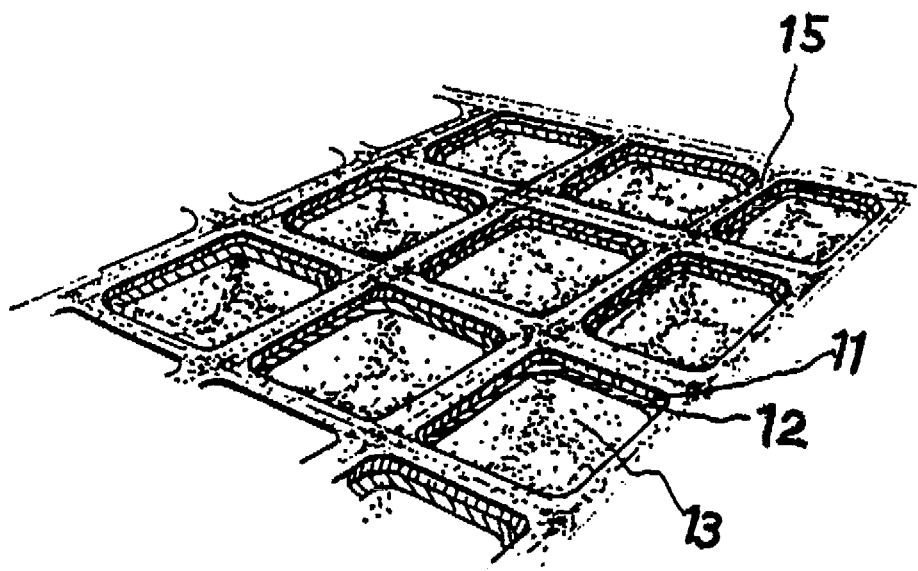
FIG. 4 is a perspective view of the product of the multilayer foam board of the present invention.

Please refer to FIGS. 1, 3 and 4. According to the present invention, a multilayer foam body 1 (having multiple colors or single color) is placed in a heating means to be heated and softened at a temperature within 130° C. to 170° C. After the multilayer foam body 1 is softened, the same is moved onto a mold 3 and pressed thereinto to be molded with a shape as that of the mold 3. Thereafter, a surface of the foam body 1 is planed to serve as the face of the foam board. Then the foam body 1 is placed in the heating means to be heated at a temperature within 100° C. to 140° C., However, because a convex portion 14 of the board face is partially planed, under the re-heating condition, the convex portion 14 will form a concave portion, while the frame line 15 pressed on the foam body by the mold 3 will be reversely convex. The restored board face is then cut into the desired profile.

Figure 2A:
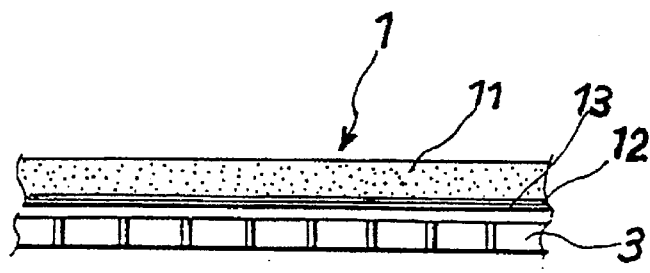
FIG. 2A is a side sectional view showing that the foam body is pressed onto the mold of the present invention.
Figure 2:
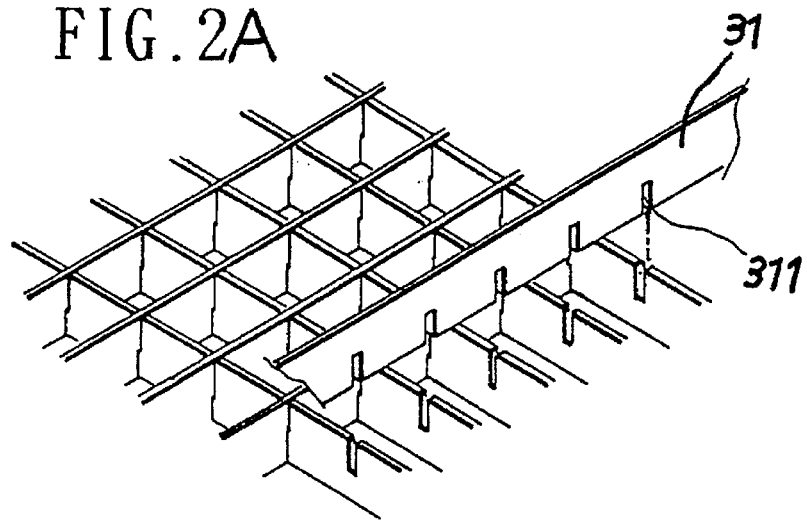
FIG. 2 is a perspective view of the mold of the present invention.

Please refer to FIG. 2. The mold 3 is composed of longitudinal and transverse mold blades 31 which are arranged in a checker pattern. The mold blades 31 are formed with insertion slots 311 for engaging with each other. Alternatively, the mold 3 can be otherwise designed with a shape corresponding to the desired shape of the foam board.

The multilayer foam body 1 includes multiple colors of layers 11, 12, 13. These layers are softened, pressed, molded and planed as Shown in FIG. 3. After the foam body 1 is re-heated, and cut into the desired shape, the multiple colors of layers of the foam body 1 are positioned as shown in FIG. 4, wherein the layer 11 is the outermost layer, the layer 12 is the intermediate layer, while the layer 13 is the innermost layer. The number and the colors of the layers can be determined as necessary. In addition, the positions of the layers can be interchanged.

The above embodiment is only an example of the present invention and the scope of the present invention should not be limited to the example. Any modification or variation derived from the example should fall within the scope of the present invention.

What is claimed is:

1. A method for manufacturing an integral multilayer foam board with concave/convex surface and multiple colors, said method comprising the steps of: placing a multilayer foam body having multiple colors into a heating means to be heated and softened at a temperature within 130° C. to 170° C.; placing the multilayer foam body onto a mold and pressing the foam body thereinto to be molded with multiple convex portions defined by concave frame lines; and partially planing the convex portion of the foam body, placing the planed foam body into the heating means to be re-heated at a temperature within 100° C. to 140° C., thereby making the convex portions form concave portions and the frame lines become convex, the restored foam body being finally cut into a desired profile.

* * * * *